United States Patent Office 3,489,696
Patented Jan. 13, 1970

3,489,696
PROCESS OF PREPARING POLYIMIDES FROM ISOCYANATES AND POLYCARBOXYLIC ACIDS
Gerald W. Miller, Pittsburgh, Pa., assignor to Mobay Chemical Company, Pittsburgh, Pa., a corporation of Delaware
No Drawing. Filed Oct. 6, 1966, Ser. No. 584,645
Int. Cl. C08g 20/32
U.S. Cl. 260—2.5   10 Claims

ABSTRACT OF THE DISCLOSURE

A process for preparing polyimides which are particularly useful as lacquers wherein an organic polyisocyanate is reacted with a polycarboxylic acid containing vicinal carboxylic acid groups.

---

This invention relates to polyimides and more specifically to a method for the preparation of polyimides from polycarboxylic acids.

Polyimides have recently become of considerable importance because of their outstanding resistance to high temperatures. Further, other polymeric materials heretofore unsuitable in certain applications requiring properties such as stability to high temperatures have been known to have suitable properties if a sufficient number of imide linkages are incorporated into the molecule, and the same holds true in the case of polyblends.

Heretofore, polyimides have been prepared generally by the direct condensation of diamines with aromatic tetracarboxylic acid dianhydrides. In such processes a dry box must be used, and the reaction must usually be carried out under a nitrogen atmosphere. In any case, heat or catalytic conditions must be employed to initiate the reaction to the polyamic acid intermediate which must, in turn, be heated to carry the reaction through to the final product. For either step, at room temperature no reaction occurs. Similar disadvantages exist in other prior art processes in which a polyamine, an aminocarboxylic acid or an aminoalcohol are condensed with a carboxylic acid containing at least one cyclic anhydride group, or in which an isocyanate is reacted with a compound containing a cyclic anhydride grouping which reacts with the isocyanato group to split off carbon dioxide. Each of these methods requires more than one step and each step requires long reaction times at elevated temperatures and, in some cases, catalysis. As a consequence, where it is desirable to use a prepolymer, copolymer or polyblend containing imide linkages, the preparation of the prepolymer, copolymer or the polyblend is even more complicated by further reaction steps, different reaction conditions for each portion of the preparation, additional purification steps and the like.

It is therefore an object of this invention to provide a method for the preparation of imides which is devoid of the foregoing disadvantages.

It is a further object of this invention to provide prepolymers, copolymers and polyblends containing imide linkages by a process which is devoid of the foregoing disadvantages.

A still further object of this invention is to provide a reaction for the preparation of imides, prepolymers, copolymers and polyblends containing imide linkages which require no precautions and which is rapid, efficient and initiates itself instantaneously on mixing the reactants.

Still another object of this invention is to provide a process for the preparation of prepolymers, copolymers and polyblends having greatly improved physical properties.

A further object of this invention is to provide compositions useful in the manufacture of foams, lacquers, films and foils which are resistant to high temperatures and have a high tensile strength.

The foregoing objects and others which will become apparent from the following description are accomplished in accordance with this invention, generally speaking, by a process which comprises reacting a polycarboxylic acid having vicinal carboxyl groups with an organic polyisocyanate. An anhydride or thioanhydride may also be used in the preparation of the imide structure according to the process of this invention if it is first hydrolyzed to the corresponding acid. The reaction between an isocyanate and a vicinal diacid is instantaneous, whereas the reaction of an anhydride or a vicinal diacid and an amine, for example is slow depending upon the temperature employed. No precautions need be taken in order to insure a high yield of relatively pure product since the reaction begins immediately simply upon mixing the polycarboxylic acid and the isocyanate. No catalysis, elevated temperature or pressure are required in order to initiate the reaction and the final product may be attained simply by allowing the reaction mixture to stand for a period of time after the initial reaction to yield the intermediate product has taken place. However, if it is so desired, the final product can be achieved almost immediately from the intermediate product or from the initial reactants with the application of heat, and preferably at temperatures of at least 100° C. This process also enables the preparation of unique prepolymeric materials containing imide groupings which may then be easily incorporated into polymeric systems such as, for example, of polyurethanes to yield a polymer which is thermally stable and contains all of the desirable properties of the imide grouping as well as the urethane grouping. The prepolymers are prepared by reacting an excess of a polyisocyanate with a polycarboxylic acid having at least two pairs of vicinal carboxyl groups or an excess of the acid with a polyisocyanate. Should it be so desired, prepolymers may be prepared which act as chain stoppers as more fully discussed hereinafter, in which case the tetracarboxylic acid would contain only a single pair of vicinal carboxylic acid groups and the isocyanate would be a polyisocyanate or the isocyanate would be a monoisocyanate and the acid would contain at least two pairs of vicinal carboxyl groups. A further advantage to this method for the preparation of polyimides is the facile copolymerization that can be achieved in a substantially one-shot system. For example, an excess of a polyisocyanate, a tetracarboxylic acid having the carboxyl groups in pairs in which the carboxyl groups are vicinal to one another and a polyol may be reacted in a one-shot system to yield a poly-urethane-imide) copolymer. On the other hand, an excess of the vicinal carboxylic acid groupings, a polyisocyanate and a compound containing groups reactive with carboxylic acid groups in addition to the polyisocyanate may be used. In fact, the process of the instant invention may be used in any system containing a third reactant capable of reacting with isocyanate groups or carboxylic acid groups, as well as in systems of polyblends. Thus it is possible to prepare poly-imide-esters) from the reaction of a polyisocyanate, an excess of a vicinal diacid and a glycol, triol, tetrol and the like; a poly(imide-amide) from a polyisocyanate, an excess of a vicinal diacid and an amine; a poly(imide-ester-amide) from a polyisocyanate, an excess of a vicinal diacid, a glycol and an amine; a poly-imide-amide) from a polyisocyanate and a compound containing at least one pair of vicinal carboxylic acid groups, as well as in systems of polyblends. Thus it one another and a polyol; a poly(urea-imide) from an excess of polyisocyanate, a vicinal diacid and a diamine or polyamine; a poly(urethane-ester-imide) from a polyisocyanate, a vicinal diacid and an hydroxyl polyester; a poly(urea-imide) from a polyisocyanate, a vicinal diacid and water; a poly(thio-urethane-imide) from a polyisocyanate, a vicinal diacid and a polythiol; a poly(ether-urethane-imide) from a polyisocyanate, a vicinal diacid and an hydroxyl polyether; a poly(amide-imide) from a polyisocyanate, a vicinal diacid and a dicarboxylic acid, and so on. The possible combinations feasible in preparing copolymers having the imide grouping therein according to the process of this invention are numerous. In addition to the foregoing combinations, the polyisocyanate and vicinal diacid may also be reacted with any and all compounds containing the N-H grouping including primary and secondary amines as well as ammonia, hydrazines, amino carboxylic acids, salts, especially sodium salts of amino-sulfonic acids, hydroxylamines, imides, amidines, nitramines, diazoamino compounds, phenylhydrazones, cyanamides, aminooximes, sulfimides, acylureas, thioureas, hydrazoic acids, isothioureas, and, at temperatures sufficiently low so that the carboxyl group does not react or other side reactions occur, the basic salts and esters of the amino acids.

The polyisocyanate and the vicinal diacid may also be reacted with an amide to yield a poly(acylurea-imide) copolymer. N-substituted amides may give the normal addition products although more vigorous reaction conditions may be used to produce poly(amidine-imide) or a mixture thereof with poly(acylurea-imides), especially when the isocyanate is p-toluene sulfonyl isocyanate; N,N-dialklyamides yield much the same type of product. Further, like the amides of carboxylic acids, sulfonamides will add to isocyanates to yield the corresponding product.

Ureas may be reacted with polyisocyanates and vicinal diacids to yield poly-biuret-imides), and urethanes may be similarly reacted to form poly(allophanate-imides).

Essentially all compounds containing a hydrogen atom attached to oxygen will react with a polyisocyanate and vicinal diacid to yield a copolymeric material, including alcohols such as, for example, alkane, alkene and alkyne diols, triols, tetrols and the like, phenols, polyesters, polyethers, polyacetals, castor oil, water, carboxylic acids, hydroxylamines, compounds which enolize such as $C_5H_6O_2$, benzohydroxamic acid, oximes, dioximes, hydroxamic acids, hydroperoxides, hydrogen peroxide, hydroxysilanes, compounds containing C—H bonds in which the hydrogen may readily be replaced by sodium including malonic esters, nitroalkanes, acetoacetic esters, acetylacetone and the like as well as methylene compounds containing two activating groups such as, for example, carbonyl, ester, nitrile, nitro; the a-position of pyrrole and the methylene group of N-alkyl-2-methylenedihydropyridine and related compounds which act similarly. Sulfur compounds react in a manner similar to their oxygen analogs and mercaptans, thiophenols, alkane, alkene, and alkyne thiols having two or more —SH groups, mercaptobenzothiazole, polyhydric polythioethers, hydrogen sulfide, and metal salts of hydrogen sulfide may be used to yield poly(thiourea-imides), poly(thiourethane-imides) and the like.

Further, addition products of isocyanates and unsaturated compounds such as styrene, ethylene and the like in the reaction with vicinal diacids may also yield copolymers in accordance with this invention. The isocyanate may also be dimerized or trimerized with a suitable catalyst to yield a copolymeric isocyanurate-imide or uretidine dione-imide, and mixed dimers and trimers are also suitable in the preparation of the copolymer in accordance with this invention.

Therefore, any suitable compound containing active hydrogen atoms which are reactive with isocyanate groups may be used to prepare copolymers in a reaction with a polyisocyanate and a vicinal diacid within the scope of this invention. Some such suitable compounds are, for example, the aliphatic polyols, hydroxyl polyesters, polyalkylene ethers with initiators, polyhydric polythioethers, polyester amides, polyacetals, thiols, polyamines and phosphorous containing compounds listed in U.S. Patent 3,201,372. In addition, any silicone resins which contain free hydroxyl groups such as, for example,

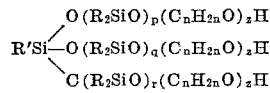

wherein R′, R, $p$, $q$, $r$, $n$ and $z$ are as hereinafter defined, may also be used as polyhydroxy compounds as well as phenol-formaldehyde condensates. Addition products of alkylene oxides to ammonia, amines or hydrazines such as triethanolamine, triisopropanolamine and the like as well as polycarbonates having free hydroxyl groups may also be used.

Compounds containing secondary amino groups may also be used. Some such suitable compounds are, for example, diethylamine, dimethylamine, propylbutylamine, N-methyl aniline, N,N′-dimethyl-p-amino aniline, N,N′-dibutyl-2,4-diamino toluene, hydrazines such as, for example, N,N′-dimethyl hydrazine, N,N′-dioctylhydrazine and the like.

Some useful compounds having predominately secondary hydroxyl groups which may also be used are castor oil, brominated or hydrogenated castor oil, reaction products of castor oil with polyhydric alcohols, octadene-9-diol-1,12, polyether alcohols derived from propylene oxide and a polyhydric alcohol, an amine, hydrazine or ammonia, epoxy resins produced from polyhydric alcohols or phenols with epichlorohydrin in alkaline solution and the like and mixtures thereof.

Any suitable polycarboxylic acid may also be used such as those listed in U.S. Patent 3,201,372 for the preparation of polyesters.

Any suitable amino acid may also be used such as, for example, carbamic acid, glycine, glycocol, alanine, leucine, isovaline, serine, methionine, thyroxine, aspartic acid, glutamic acid, arginine, lysine, citrulline, histidine, proline, hydroxypryline and the like as well as salts and esters of any of the foregoing.

Any suitable sulfonic acid as well as the salts thereof, particularly the sodium salt, may also be used. Some such suitable sulfonic acids are, for example, hydroxy sulfonic acids such as 2-naphthol-8-sulfonic acid, amino sulfonic acids such as aniline sulfonic acids such as aniline-m-sulfonic acid, hydroxyamino sulfonic acids such as 2-amino-5-naphthol-7-sulfonic acid, disulfonic acids such as benzene-1,5-disulfonic acid, hydroxy-disulfonic acids such as phenol-3,5-disulfonic acid, amino disulfonic acids such as 1-naphthylamine-4,7-disulfonic acid, dihydroxy disulfonic acids such as 1,4-dihydroxybenzene-3,5-disulfonic acid, aminohydroxy disulfonic acids such as 1-amino-8-naphthol-3,6-disulfonic acid, trisulfonic acid such as 1-naphthylamine-3,6,8-trisulfonic acid and the like and the sodium and calcium salts of the foregoing.

In addition to the foregoing, more complex materials may also be used. For example, any suitable imides such as guanidine, amidines such as acetamidine, nitramine such as methylnitramine, diazoamines such as phenyltriazene, phenylhydrazones such as those formed by the reaction of phenylhydrazine on aldehydes and ketones such as benzaldehyde and acetone, cyanamides such as carbamic acid nitril, oximes, dioximes and amino oximes such as the condensation products of aldehydes such as benzaldehyde or ketones such as acetone with hydroxylamine, formaminooxime, and glyoxime, sulfimides such as methylsulfimide, acylureas such as acetylurea, thioureas such as thiocarbamide, hydrazoic acid, isothioureas such as isothiocarbamide, amides such as formamide, substituted amides such as methylformamide and N,N′-dimethylformamide, sulfonamides such as methylsulfonamide, ureas such as carbamide, urethanes such as those prepared by the reaction between any isocyanate and any active hydrogen containing compound as mentioned herein, hydroxamic acid, phenol and phenols such as 3,5-dimethylphenol, benzohydroxamic acid, hydroperoxides, hydrogen peroxide and the like may also be used, as well as hydroxylamine, cyanamide, hydrazoic acid and the like.

Additional functional groups in the foregoing compounds or any other functional groups contained therein such as, for example, methoxy, ethoxy, propoxy, butoxy and the like; carboalkoxy groups such as, for example, carbomethoxy, carbethoxy and the like; dialkyl amino groups such as, for example, dimethyl amino, dipropyl amino, methylethyl amino and the like; mercapto, carbonyl, thiocarbonyl, phosphoryl, phosphato and the like groups may participate in the reaction to yield even more mixed products with the polyisocyanate and vicinal diacid if desired. Monofunctional counterparts of any of the foregoing compounds may be used to control the molecular weight of the polymer being formed by acting as chain stoppers.

Any suitable isocyanate may be used and all isocyanates are contemplated. Some such suitable isocyanates are, for example, those listed in Canadian Patent 698,638, as well as tetramethylenediisocyanate,
hexamethylenediisocyanate,
1,4-phenylenediisocyanate,
1,3-phenylenediisocyanate,
1,4-cyclohexylenediisocyanate,
2,4-tolylenediisocyanate,
2,5-tolylenediisocyanate,
2,6-tolylenediisocyanate,
3,5-tolylenediisocyanate,
4-chloro-1,3-phenylenediisocyanate,
1-methoxy-2,4-phenylenediisocyanate,
1-methyl-3,5-diethyl-2,6-phenylenediisocyanate,
1,3,5-triethyl-2,4-phenylenediisocyanate,
1-methyl-3,5-diethyl-2,4-phenylenediisocyanate,
1-methyl-3,5-diethyl-6-chloro-2,4-phenylenediisocyanate,
6-methyl-2,4-diethyl-5-nitro-1,3-phenylenediisocyanate,
p-xylylenediisocyanate,
m-xylylenediisocyanate,
4,6-dimethyl-1,3-xylylenediisocyanate,
1,3-dimethyl-4,6-bis-(b-isocyanatoethyl)-benzene,
3-(a-isocyanatoethyl)-phenylisocyanate,
1-methyl-2,4-cyclohexylenediisocyanate,
4,4'-biphenylenediisocyanate,
3,3'-dimethyl-4,4'-biphenylenediisocyanate,
3,3'-dimethoxy-4,4'-biphenylenediisocyanate,
3,3'-diethoxy-4,4-biphenylenediisocyanate,
1,1-bis-(4-isocyanatophenyl)cyclohexane,
4,4'-diisocyananto-diphenylether,
4,4'-diisocyanato-dicyclohexylmethane,
4,4'-diisocyanato-diphenylmethane,
4,4'-diisocyanato-3,3'-dimethyldiphenylmethane,
4,4'-diisocyanato-3,3'-dichlorodiphenylmethane,
4,4'-diisocyanato-diphenyldimethylmethane,
1,5-naphthylenediisocyanate,
1,4-naphthylenediisocyanate,
4,4',4''-triisocyanato-triphenylmethane,
2,4,4'-triisocyanato-diphenylether,
2,4,6-triisocyanato-1-methyl-3,5-diethylbenzene,
o-tolidine-4,4'-diisocyanate,
m-tolidine-4,4'-diisocyanate,
benzophenone-4,4'-diisocyanate,
biuret triisocyanates of any of the foregoing such as, for example, from 3 mols hexamethylene diisocyanate and 1 mol water; carbodiimides with free terminal NCO groups, for example, from polyisocyanates with catalysts such as phosphine oxides; dimers and trimers of any of the foregoing isocyanates having free NCO groups; prepolymers prepared from any of the foregoing having terminal NCO groups; the hydrogenated form of any of the foregoing unsaturated isocyanates and particularly hydrogenated tolylene diisocyanate and hydrogenated 4,4'-diphenylmethane diisocyanate, the corresponding thiocyanates of any of the foregoing and mixtures thereof and the like. The monoisocyanates may be used to control the molecular weight of the polymer being formed by acting as chain stoppers.

Any suitable mixture of the aforementioned isocyanates as well as unrefined or crude isocyanates may also be used. For example, crude toluylene diisocyanates can be obtained by the phosgenation of a mixture of toluylene diamines and crude diphenylmethane isocyanates can be obtained by the phosgenation of crude diphenylmethane diamine which is the reaction product of aniline and formaldehyde in the presence of HCl. Such polyisocyanates are generally mixtures of organic polyisocyanates having the generic formula:

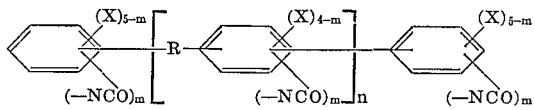

in which R is an organic radical and preferably an aliphatic radical obtained by removing the carbonyl oxygen from an aldehyde or ketone and is preferably —CH$_2$—, $m$ is 1 or 2, X is halogen, lower alkyl or hydrogen and $n$ is 0, 1, 2 or 3. The aliphatic radical R, in the foregoing formula may be obtained by removing the carbonyl oxygen from any suitable aldehyde or ketone such as formaldehyde, acetaldehyde, propionaldehyde, butyraldehyde, N - heptaldehyde, benzaldehyde, cyclohexane, aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, H$_2$C=O, the radical remaining is

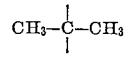

When X is a halogen, it may be any suitable halogen but is preferably chlorine or bromine and further, it is preferred that the amount of chlorine or bromine fall between about one percent and fifteen percent by weight of the compound. When X is lower alkyl, it is most preferably methyl or ethyl but other lower alkyl radicals such as propyl, butyl and the like may be the radical X. The polyaryl alkylene polyisocyanates of the invention are preferably mixtures of di- and higher polyisocyanates. Thus, $n$ in the formula preferably has a value of from about 0.1 to 1.5. To illustrate, in a mixture of isocyanates of the above formula containing 90 percent diisocyanate and 10 percent triisocyanate, $n$ would have a value of 0.1. For a mixture containing 20 percent di-, 30 percent tri-, 30 percent tetra- and 20 percent pentaisocyanate, the average value of $n$ would be 1.5. A most preferred value for $n$ is between about 0.85 and about 1.1 with about 40 percent to about 60 percent of the mixture of polyisocyanates being a diisocyanate.

Isocyanates of the above formula are well-known and available commercially. They may be prepared as disclosed in U.S. Patent 2,683,730. A specific isocyanate suitable for use in accordance with the present invention may be obtained by reacting about 60 parts aniline with about 25 parts of formaldehyde (aqueous, 37 percent CH$_2$O) and about 74 parts of HCl (aqueous, 30 percent HCl) at a temperature of about 90° C. to about 100° C. for about 1.5 to 2 hours and then reacting this product with NaOH and separating out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed. The best products have 40 percent to 60 percent 4,4-diphenylmethane diisocyanate, an amine equivalent of about 125 to about 140, about 0.04 to about 0.4 percent by weight hydrolyzable chloride, about 0.1 to about 0.6 percent by weight total chloride and having a flash point of above about 400° F. When toluylene diisocyanates, for example, are produced by conventional phosgenation of the corresponding diamines, a product containing about 90 percent 2,4- and 2,6-tolylene diisocyanate and the balance a crude residue of imidazoles and the like resulting in the phosgenation is obtained from the phosgenator. This product may also be used. It is preferred to phosgenate a mixture of ortho- and para-tolylene diamides. A specific product is the undistilled reaction mixture obtained by the phosgenation of 80 percent 2,4-tolylene diamine and 20 percent 2,6-tolylene diamine containing 90 percent of a mixture of about 80 percent 2,4-tolylene diisocyanate and 20 percent 2,6-tolylene diisocyanate and the balance polymers incapable of accurate analysis.

Any suitable tetracarboxylic acid having acid groups ortho to one another may be used in the practice of this invention. Further, any other suitable dicarboxylic acid having acid groups ortho to one another may also be used if desired, but since they contain only one reactive site in accordance with this invention, they would act as chain stoppers, terminating the development of the polymer and resulting in shorter chained molecules, depending on the concentration used. If all of the acid used contained only two acid groups vicinal to one another, only short chained polymers would result, and each would contain only as many imide groupings as there are NCO groups in the isocyanate. The most preferred tetracarboxylic acids which may be used have the structures:

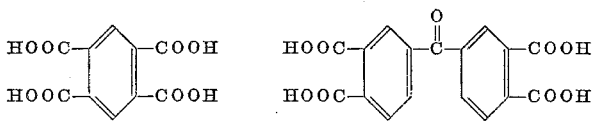

Any suitable unsaturated anhydride can be copolymerized with various ethylenic monomers to yield a polyanhydride which can be hydrolized to the corresponding carboxylic acid as in the following equation:

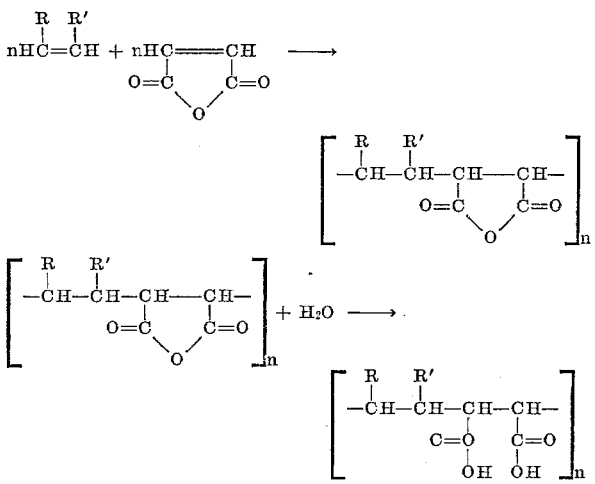

wherein R and R' may be any suitable substituted or unsubstituted grouping and may be the same or different. For example, R and R' may be any substituted or unsubstituted alkyl, aryl, alkaryl or aralkyl radical, an ester of the formula RCOOR' wherein R and R' are as described hereinbefore, an ether of the formula ROR' wherein R and R' are as described hereinbefore, a heterocyclic, a ketone of the formula RCOR' wherein R and R' are as described hereinbefore, an aldehyde of the formula RCHO wherein R is as described hereinbefore, a urea of the formula RNHCONHR' wherein R and R' are as hereinbefore described, a urethane of the formula RNHCOOR' wherein R and R' are as described hereinbefore, a carbonate of the formula ROCOOR' wherein R and R' are as described hereinbefore, an amide of the formula RCONHR' wherein R and R' are as described hereinbefore, sulfones of the formula RSOOR' wherein R and R' are as described hereinbefore and the like. R and R' may be substituted with any suitable substituents such as, for example, halogen atoms including chloro, bromo, iodo, fluoro, and the like; nitro groups; alkoxy radicals such as, for example, methoxy, ethoxy, propoxy, butoxy and the like; carboalkoxy groups such as, for example, carbomethoxy, carbethoxy and the like; dialkyl amino groups such as, for example, dimethylamino, dipropylamino, methylethylamino and the like; carbonyl, phosphoryl, phosphato, siloxy, and the like groups. R and R' may also be hydrogen and/or halogen such as, for example, chloro, bromo, fluoro and iodo. Some typical examples of radicals which may be R and/or R' are methyl, butyl, 2,2-dimethylpropyl, decyl, nondecyl, eicosyl, cyclopropyl, cyclohexyl, cycloeicosyl, b-cyclobutyl-propyl, a-cycloamyl-isopropyl, phenyl, naphthyl, acenaphthene, chrysene, triphenylene, benzyl b-phenyl-isopropyl, a-(a'-naphthyl)ethyl, a'-anthrylmethyl, tolyl, xylyl, cumenyl, 7-ethyl-b-naphthyl, 5,8-diisopropyl-b-naphthyl, pyridine, pyran, thiophan, pyrrole, furan, thiophen and the like. It is to be understood, therefore, that any compound within any and all of the generic classes of compounds set forth may constitute the substituents R and R' and that the foregoing listing is illustrative and not limitative.

In addition, polymers may be fabricated according to the foregoing equation by hydrolyzing the reaction product of two mols of the anhydride and an ethylenically unsaturated compound as is illustrated by the fromula

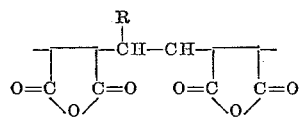

where R and R' are as hereinbefore described. Thus, copolymeric polyacids such as, for example, a hexene-maleic acid copolymer, an octene-maleic acid copolymer and the like may be used. Further, any other copolymeric vicinal diacid within the definition of this invention may also be used. Some such suitable materials include the reductive hydrolysis product of orthochlorophthalic anhydride, the reductive acid hydrolysis product of phthalic anhydride and formaldehyde, the hydrolysis product of a diphenyl silane-maleic anhydride adduct, the hydrolysis product of a sulfur dichloride-maleic anhydride adduct, the hydrolysis product of a phthalic anhydride tar or polycyclic aromatic hyddrocarbon adduct, 3,3',4,4'-diphenylsulfone tetracarboxylic acid and the like. The maleic acid segment of such polymers may be replaced by any other similar suitable acid such as, for example, itaconic, citraconic, alkyl substituted maleic acid and the like. The more economical anhydrides are the ethylenic copolymers with maleic anhydride and the addition product of $S_2Cl_2$ and maleic anhydride, the latter product incorporating flame retardant properties into any product in which it is incorporated either in the anhydride or acid form, such as, for example, a foam. In addition, any suitable polymeric material having more than one set of vicinal carboxyl groups may also be used. Some such suitable polymeric materials include, for example,

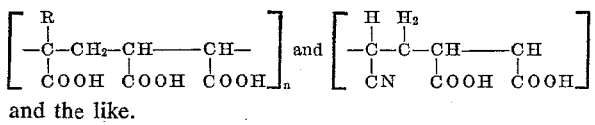

and the like.

Further, any other suitable vicinal diacid may be used such as, for example, 2,3,2',3'-diphenyl tetracarboxylic acid, 2,3,5,6-diphenyl tetracarboxylic acid, 2,3,2',3'-diphenyl-2,2-propane tetracarboxylic acid, 3,4,3',4'-diphenyl tetracarboxylic acid, pyromellitic acid, benzophenone tetracarboxylic acid, cyclopentane tetracarboxylic acid, cyclohexane tetracarboxylic acid, 2,3,2',3'-diphenylmethane tetracarboxylic acid, cycloheptane tetracarboxylic acid, 3,4,3',4'-diphenylmethane tetracarboxylic acid, 2,3,3',4'-diphenyl tetracarboxylic acid, benzene tetracarboxylci acids such as 1,2,3,4-benzene tetracarboxylic acid, 2,3,3′,4′-diphenylmethane tetracarboxylic acid, 2,3,2′,3′-diphenylethane tetracarboxylic acid, 2,3,3′,4′-diphenyl-2,2-propane tetracarboxylic acid, 2,3,5,6,2′,3′-diphenyl hexacarboxylic acid, 2,3,5,6,2′,3′,5′,6′-diphenyloctacarboxylic acid, 2,3,5,6,2′,3′-diphenylmethane hexacarboxylic acid, 2,3,5,6,2′,3′-diphenyl-2,2-propane hexacarboxylic acid, 2,3,5,6,2′,3′,5′,6′-diphenylmethaneoctacarboxylic acid 2,3,5,6,2′,3′,5′,6 - diphenyl-2,2-propane octacarboxylic acid, 1,2,5,6-naphthalene tetracarboxylic acid, 1,2,7,8-naphthalene tetracarboxylic acid, 2,3,6,7-naphthalene tetracarboxylic acid, 3,4,5,6-naphthalene tetracarboxylic acid, 3,4,7,8-naphthalene tetracarboxylic acid, 3,4,6′,7′,1,2′ - bi - naphthyltetracarboxylic acid, 1,2,5,6-anthracene tetracarboxylic acid, 1,2,7,8-anthracene tetracarboxylic acid, 2,3,6,7-anthracene tetracarboxylic acid, 1,2,3,4,5,6,7,8-anthracene octacarboxylic acid, 2,3,5,6,7,8-anthracene hexacarboxylic acid and the like. In addition, in that embodiment of the invention in which a copolymer is prepared from a carboxylic acid containing at least one pair of vicinal acid groups as well as other acid groups not vicinal to one another, any compound which fits the foregoing description can be used and all are contemplated. Examples of some such suitable acids are, for example, 2,3,5,8,9-chrysene pentacarboxylic acid, 1,2,4,6,7-naphthalene pentacarboxylic acid, 1,2,7-anthracene tricarboxylic acid, 1,2,4-benzene tricarboxylic acid, 3,4,6-naphthalene tricarboxylic acid, 2,3,6,3′-diphenylmethane tetracarboxylic acid, 2,4,3′,4′-diphenyl tetracarboxylic acid, 2,3,6,2′4′,6′-diphenyl hexacarboxylic acid, 1,2,4,8-octane tetracarboxylic acid, 1,2,5,7-anthracene tetracarboxylic acid and the like.

The molecular weight of the polymer may be controlled by the addition of dicarboxylic acids in which the acid groups are ortho to one another and which act as chain stoppers. Any suitable dicarboxylic acids may be used for this purpose, such as, for example, the dicarboxylic acid counterpart of any of the polycarboxylic acids listed herein including phthalic acid, oxalic acid, 3-chlorophthalic acid, maleic acid, succinic acid, 3,4-diphenyl dicarboxylic acid, 4,5-diphenylmethane dicarboxylic acid and the like.

In the practice of this invention, the anhydride precursor of any of the polycarboxylic acids listed may also be used as well as the thioanhydride if there is a small amount of water present to act as an initiator or if they are first hydrolyzed to the corresponding acid before the formation of the imide begins.

The reaction may be carried out in any suitable solvent or solvent system in which the components of the reaction are soluble. Therefore, the solvent may be a strongly polar solvent such as, for example, any of the cyclic sulfones and sulfoxides, N-methyl pyrolidone, dimethyl sulfoxide, tetramethylene sulfone, dimethylacetamide, dimethylformamide; or in a mixed solvent system of a strong polar solvent such as any of the foregoing and another solvent such as, for example, methylene chloride, o-dichlorobenzene, xylene, toluene, cresol, acetone, ethyl acetate, dioxane, ethylene glycol, monoethyl ether acetate and the like. Preferably, the strongly polar solvents are used; however, if all of the components of the reaction mixture are soluble in non-polar solvents, then the reaction may be carried out without the inclusion of a strongly polar solvent. Even further, the reaction may be carried out without a solvent if a solid state reaction will take place or the reactants are soluble in one another. It is to be noted, however, that the solvent may play an important part in the rate of the reaction making the use of a solvent most advantageous. In particular, solvents such as dimethylsulfoxide, dimethylacetamide and dimethylformamide are most preferred for their positive effect on the reaction rate.

Polyimides may also be used in polyblends to impart increased thermal resistance to other polymers. Any suitable polymer may be blended with the polyimides of this invention and all are contemplated including ethylenic polymers, polyurethanes, polyesters, polyethers, polysulfones, polysulfonates, polyamides, polycarbonates, polyureas and so on. Some such polymers are described in U.S. Patents 2,948,691; 3,028,365; 3,236,808; 3,236,809; 3,245,947; 3,048,564; 3,049,518; 3,057,826; 3,063,966; 3,178,402; 3,112,300, and C and E News, Apr. 12, 1965, p. 28.

As a result of the process of this invention, imides and copolymers containing imide linkages may be prepared directly in one-shot systems to yield foams, elastomers, films, fibers, coatings, enamels, lacquers and the like or else, the imides, the imide-containing prepolymers and the copolymers and polyblends prepared according to the process of this invention may then be used in further reactions to prepare any desired end product. The isocyanate terminated prepolymer may be reacted with any suitable compound containing reactive hydrogen atoms which are reactive with NCO groups as set forth herein to prepare a polyurethane containing imide groups, for example, as well as other types of polymers and copolymers. On the other hand, if the prepolymeric material contains terminal carboxylic acid groups or any other groups which are reactive with other compounds such as isocyanates, for example, a polyisocyanate may be reacted with it in order to prepare a pure polyimide or an imide-containing polyurethane product and the like, and so on. Thus, a polyurethane elastomer may be prepared by reacting the NCO-terminated reaction product described with an active hydrogen containing compound, if desired, in the presence of a chain extending agent such as, for example, any of the diols and triols listed herein.

Cellular polyurethanes, particularly rigid cellular polyurethane materials having great stability to high temperatures may also be prepared by carrying out the described reaction in the presence of a blowing agent. Suitable processes for the preparation of cellular polyurethane plastics are disclosed in U.S. Reissue Patent 24,514 together with a suitable apparatus for mixing the components. When water is added as the blowing agent, corresponding quantities of excess NCO-terminated prepolymer to react with the water and produce carbon dioxide should be used. Instead of water, however, low boiling hydrocarbons such as pentane, hexane, heptane, pentene, heptene and the like, halogenated hydrocarbons such as dichlorodifluoroethane, dichlorodifluoromethane, trichlorofluoromethane, vinylidene chloride, methylene chloride and the like or mixtures thereof, azo compounds such as azohexahydrobenzodinitrile and the like may be used as blowing agents.

A prepolymer prepared in accordance with this invention may also be used in the production of coating compositions by carrying out the NCO-active hydrogen reaction in any suitable inert organic solvent therefor, such as, for example, ethyl acetate, methyl formamide, the diethyl ether of diethylene glycol, benzene, xylene, benzine and the like.

In the preparation of the polyurethane, any suitable catalyst such as, for example, stannous chloride, a stannous salt of a carboxylic acid having from 1 to 18 carbon atoms, a trialkyl tin oxide, a dialkyl tin chloride, a dialkyl tin oxide or a dialkyl tin salt of a carboxylic acid having from 1 to 18 carbon atoms and the like may be used. These catalysts may be used alone or in combination with any other suitable catalytic compound, preferably a tertiary amine, such as, for example, triethylene diamine, N,N,N′N′-tetramethyl butylene diamine, a 1-alkyl-4(dialkylaminoalkylene)piperazine in which the alkyl radicals have from 1 to 4 carbon atoms and the alkylene radical has from 2 to 4 carbon atoms such as is described in U.S. Patent 3,234,153, N-ethyl morpholine, or any of those which are disclosed in U.S. Patents 2,948,928; 2,941,967 and 2,948,691 and the like.

It is often advantageous, and indeed preferable in those instances where the herein-described catalysts are employed, to include other additives in the reaction mixture, such as stabilizers, emulsifiers, coloring agents and fillers and the like, for example.

It is particularly advantageous to employ an emulsifier such as, for example, sulphonated castor oil and/or a foam stabilizer such as a silicone oil, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

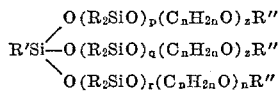

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34.

In a modification of the above formula, R' and R", in addition to being an alkyl radical having from 1 to 4 carbon atoms, may be hydrogen atoms, or hydroxyl-containing alkyl radicals having from 1 to 4 carbon atoms. A preferred compound, however, has the formula

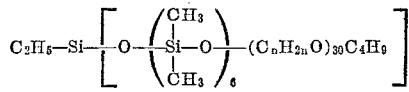

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,537, 668,478 and 670,091.

In addition, any other type of polymeric material including polyurethanes may be modified by the incorporation of the imides, prepolymers, copolymers or polyblends of this invention including polyesters, polyolefins, polycarbonates and the like. Such modification imparts a high degree of thermal stability to such materials, thus increasing the range of applications to which they may be put. Further, the products of the process of this invention may be present merely as a filler or modifier, or they may be reacted into the polymeric chain or used as chain stoppers for polymeric materials such as polyurethanes, polyesters and the like, if desired; in any case they will result in an increase in thermal stability to the product.

Even further, the imides or copolymeric products of the process of this invention may be used directly as produced in a solvent as lacquers which are resistant to high temperatures such as, for example, for wire enamels, or for the production of films and foils resistant to high temperatures. They may also be used in admixture with other conventional raw materials used in the production of lacquers, films, foils and the like such as, for example, terephthalic acid polyesters in the manufacture of wire lacquers. The lacquers, films or foils and the like obtained in this manner are distinguished from their known counterparts by their very high resistance to heat and their toughness or high tensile strength.

The invention is further illustrated but is not intended to be limited by the following examples in which all parts and percentages are by weight unless otherwise specified.

EXAMPLE 1

About 25 parts of cyclopentane tetracarboxylic acid are dissolved in about 200 ml. of freshly distilled dimethylacetamide with gentle warming. The resulting solution is mixed with a solution of about 25 parts of 4,4'-diphenylmethane diisocyanate in about 200 ml. of dimethylacetamide. The resulting solution is clear and slightly yellow.

A drop of the solution of the reaction product is heated on a potassium bromide disc to evaporate the solvent. An imide peak on an infrared spectrum at 1782 cm.$^{-1}$ shows the formation of the imide structure as a result of the reaction. Films formed from the reaction product are transparent.

EXAMPLE 2

About 25 parts of pyromellitic acid are dissolved in about 200 ml. of dimethylacetamide with slight warming and stirring. A solution of about 25 parts of 4,4'-diphenylmethane diisocyanate in about 200 ml. of dimethylacetamide is added to the pyromellitic acid solution with stirring. The evolution of bubbles occurs and the solution becomes dark amber in color while remaining transparent. The infrared spectrum of a film of the reaction product shows sharp and pronounced bands at 5.63$\mu$ and 13.85$\mu$ thus showing that the imide is present in the dimethylacetamide soluble polymer.

EXAMPLE 3

The same reaction as set forth in Example 2 is carried out using dimethylsulfoxide as the solvent. More vehement foaming and bubble propagation takes place and the product is obtained in solution that is pale yellow. A film prepared from the product solution has a deeper brown color than one prepared from the dimethylsulfoxide solution of the same product. Infrared spectra shows that the product of Example 2 is essentially identical to that produced in dimethylacetamide.

EXAMPLE 4

About 256 parts of pyromellitic acid anhydride are permitted to react with about 36 parts of water to form the corresponding vicinal diacid product. The vicinal diacid is then stirred into about 200 ml. of dimethylformamide. About 348 parts of tolylene diisocyanate are dissolved in about 200 ml. of methylene chloride and mixed with the vicinal diacid solution. Reaction occurs instantaneously without the addition of heat, pressure, catalysis or the like. A transparent pale yellow solution is formed which yields a light brown or tan film having extraordinary thermal stability when applied to a glass surface. The infrared spectrum of the resulting film shows sharp and pronounced peaks at 5.63$\mu$ and 13.85$\mu$ definitely indicating the formation of the imide linkages. About 478 parts of the imide product having terminal NCO groups are then reacted with about 2,000 parts of a polyalkylene ether glycol having a molecular weight of about 3000 and an hydroxyl number of about 45 in the presence of trichlorofluoromethane to yield a low density rigid cellular polyurethane foam having a high degree of thermal stability.

EXAMPLE 5

About 640 parts of benzophenone tetracarboxylic acid, and about 260 parts of hexamethylene diisocyanate are dissolved in about 600 ml. of dimethylformamide. Reaction takes places and the resulting solution of the carboxyl-terminated polymer is transparent. About 760 parts of the carboxyl terminated imide product are then reacted with about 348 parts of toluylene diisocyanate and about 90 parts of 1,4-butanediol to form a polyurethane millable gum which is then cured to yield a polyurethane elastomeric product having a high degree of thermal stability.

EXAMPLE 6

About 228 parts of an octene-maleic acid copolymer, about 360 parts of hydrogenated tolylene diisocyanate and about 1300 parts of a polyester prepared from adipic acid and ethylene glycol and having a molecular weight of about 1300 and an hydroxyl number of about 43 are added to about 1000 ml. of dimethylsulfoxide and stirred. A tough, elastomeric coating of poly(urethane-imide) is formed upon evaporation of the solvent.

EXAMPLE 7

About 246 parts of cyclopentane tetracarboxylic acid, about 500 parts of 4,4'-diphenylmethane diisocyanate and about 90 parts of 1,4-butanediol are dissolved in dimethylacetamide and allowed to react. The solution of the terpolymer thus formed is spread as a coating onto a slab of wood; a transparent coating is obtained having a high degree of thermal stability, a high tensile strength making it tough.

EXAMPLE 8

About 390 parts of a mixture of an isocyanate having the formula

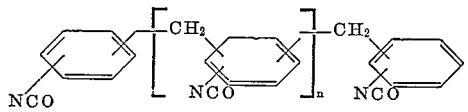

wherein n has an average value of about 0.88 and about 380 parts of pyromellitic acid are added to about 1400 ml. of dimethylsulfoxide; the reaction begins immediately. The solution thus formed is highly viscous and can be used as a thermally stable coating for steel wires.

EXAMPLE 9

About 394 parts of 3,3',4,4',-diphenylsulfone tetracarboxylic acid, about 192 parts of tolylene diisocyanate (80:20) and about 33 parts of phthalic acid are dissolved in dimethylacetamide and allowed to react. A short chain polymeric imide is formed due to the action of the phthalic acid as a chain stopper. The solution of the polymer obtained is transparent and slightly yellow.

EXAMPLE 10

About 230 parts of an octene-maleic acid copolymer having a molecular weight of about 4,000 are dissolved in about 1000 parts of benzene-dimethylacetamide (70/30, v./v.) and this solution is added to a solution of about 125 parts of 4,4'-diphenylmethane diisocyanate in about 300 parts of methylene chloride in a Waring Blendor. The polymer precipitates from the mixture, is filtered, and upon heat curing forms an amber, transparent and tough film when spread on a piece of glass. The thermosetting polymer is dimensionally stable at high temperatures.

EXAMPLE 11

To about 174 parts of tolylene diisocyanate are added with stirring about 25 parts of pyromellitic acid. A reaction occurs with the evolution of $CO_2$ and a viscous reaction mass of prepolymeric imide-isocyanate is formed. The prepolymeric imide-isocyanate is then reacted at melt temperature with about 1600 parts of a polyester prepared by the reaction between diethylene glycol and adipic acid and having a molecular weight of about 2000 to form a thermoplastic poly(imide-urethane).

EXAMPLE 12

To about 50 parts of a polyimide formed from about 250 parts of 4,4'-diphenylmethane diisocyanate and about 250 parts of pyromellitic acid are added about 50 parts of a 2,2-(4,4'-dihydroxy-diphenyl)propane polycarbonate resin. The composite polyblend material has an increased thermal resistance over that of the native polycarbonate.

EXAMPLE 13

About 230 parts of an octene-maleic acid copolymer having a molecular weight of about 2000 is dissolved in about 400 parts of dimethylacetamide. To this solution are added about 120 parts of phenyl isocyanate. After stirring and heating, the solvent is evaporated and a thermoplastic imide polymer is formed which demonstrates exceptional thermal properties.

EXAMPLE 14

To about 174 parts of tolylene diisocyanate are added with stirring about 25 parts of pyromellitic acid. A reaction occurs with the evolution of $CO_2$ and a viscous reaction mass of prepolymeric imide-isocyanate is formed. The prepolymeric imide-isocyanate is then reacted at melt temperature with about 1600 parts of a polypropylene oxide polyether having a molecular weight of about 2000 to form a thermoplastic poly(imideurethane).

It is to be understood that any of the components and conditions mentioned as suitable herein can be substituted for its counterpart in the foregoing examples and that although the invention has been described in considerable detail in the foregoing, such detail is solely for the purpose of illustration. Variations can be made by those skilled in the art without departing from the spirit and scope of the invention except as is set forth in the claims.

What is claimed is:

1. A process for the preparation of an imide-containing polymer which comprises reacting in the absence of anhydride an organic isocyanate with a carboxylic acid containing at least one pair of vicinal carboxylic acid groups wherein one isocyanate group reacts with each pair of vicinal carboxylic acid groups to form an imide linkage.

2. The process of claim 1 wherein the reaction is carried out in a solvent.

3. The process of claim 1 wherein the reaction mixture is heated to a temperature of at least about 100° C.

4. The process of claim 1 wherein the reaction mixture contains an excess of the organic isocyanate which is a polyisocyanate, the carboxylic acid contains at least two pairs of vicinal carboxylic acid groups and the reaction mixture contains a compound containing groups which are reactive with NCO groups.

5. The process of claim 1 wherein the reaction mixture contains an excess of the carboxylic acid which contains at least two pairs of vicinal carboxylic acid groups, an organic polyisocyanate and a second compound containing groups reactive with carboxylic acid groups other than isocyanate groups.

6. A process for the preparation of a copolymer containing imide linkages which comprises reacting in the absence of anhydride an NCO-terminated prepolymer prepared by the process of claim 1 with an organic compound containing at least two groups which are reactive with NCO groups other than vicinal carboxylic acid groups.

7. The process of claim 6 wherein the reaction mixture contains a blowing agent and a foam is formed.

8. The process of claim 6 wherein an elastomeric product is prepared.

9. The process of claim 6 wherein the reaction is carried out in a solvent.

10. A process for the preparation of imides by the process of claim 1 wherein the carboxylic acid is prepared by the hydrolysis of the reaction product of an unsaturated anhydride and an ethylenically unsaturated compound.

References Cited

UNITED STATES PATENTS

| | | | |
|---|---|---|---|
| 3,300,420 | 1/1967 | Frey | 260—25 |
| 3,314,923 | 4/1967 | Muller et al. | 260—78 |

DONALD E. CZAJA, Primary Examiner

M. B. FEIN, Assistant Examiner

U.S. Cl. X.R.

260—47, 77.5, 78, 857, 858

UNITED STATES PATENT OFFICE
CERTIFICATE OF CORRECTION

Patent No. 3,489,696 January 13, 1971

Gerald W. Miller

It is certified that error appears in the above identified patent and that said Letters Patent are hereby corrected as shown below:

Column 2, line 51, "poly-urethane-imide)" should read -- poly(urethane-imide) --; line 59, "poly-imide-esters)" should read -- poly(imide-esters) --; line 65, "poly-imide-amide)" should read -- poly(imide-amide) --; line 67, ", as well as in systems of polyblends. Thus it" should read -- as well as other acid groups not vicinal to --. Column 3, line 32, "poly-biuret-imides)" should read -- poly(biuret-imides) --. Column 5, line 19, after "Canadian Patent" cancel "698,638" and insert -- 698,636 --; line 47, "1,1-bis-(4-isocyanatophenyl) cyclohexane," should read -- 1,1'-bis-(4-isocyanatophenyl)cyclohexane, --. Column 6, lines 14 to 19, the right-hand portion of the formula should appear as shown below:

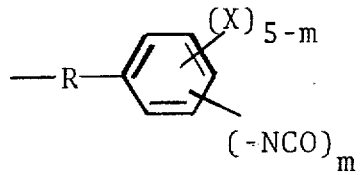

line 28, "cyclohexane," should read -- cyclohexane --. Column 7, line 8, "mides." should read -- mines. --. Column 11, line 15, the last line of the formula should appear as shown below:

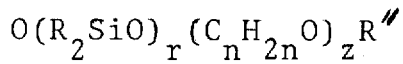

Signed and sealed this 25th day of May 1971.

(SEAL)
Attest:

EDWARD M. FLETCHER, JR.
Attesting Officer

WILLIAM E. SCHUYLER, JR.
Commissioner of Patents